(12) United States Patent
Semmes

(10) Patent No.: US 7,802,799 B1
(45) Date of Patent: Sep. 28, 2010

(54) METHOD OF JOINING METALLIC AND COMPOSITE COMPONENTS

(75) Inventor: Edmund B. Semmes, Madison, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1045 days.

(21) Appl. No.: 11/527,653

(22) Filed: Sep. 18, 2006

(51) Int. Cl.
*F16J 15/00* (2006.01)

(52) U.S. Cl. .................. 277/627; 277/616; 277/626; 277/652; 52/782.1; 52/745.21

(58) Field of Classification Search ............. 52/782.1, 52/741.1, 745.19, 745.21; 277/616, 626, 277/627, 652; 285/238–259, 222.1, 149, 285/242; 526/317.1, 319, 307.6, 220, 236, 526/142

See application file for complete search history.

(56) References Cited

U.S. PATENT DOCUMENTS

| | | | |
|---|---|---|---|
| 4,875,616 A | 10/1989 | Nixdorf | |
| 5,115,962 A | 5/1992 | Anderson et al. | |
| 5,443,099 A * | 8/1995 | Chaussepied et al. | ....... 138/109 |
| 5,466,506 A | 11/1995 | Freitas et al. | |
| 5,862,975 A | 1/1999 | Childress | |
| 5,868,886 A * | 2/1999 | Alston et al. | .................. 156/98 |
| 5,944,124 A * | 8/1999 | Pomerleau et al. | .......... 175/320 |
| 5,972,524 A | 10/1999 | Childress | |
| 6,364,368 B1 * | 4/2002 | Kilgore | ...................... 285/251 |
| 6,632,540 B2 * | 10/2003 | DiChiara et al. | ......... 428/472.2 |
| 6,645,333 B2 | 11/2003 | Johnson et al. | |
| 6,863,279 B2 * | 3/2005 | Salama | ...................... 277/616 |

* cited by examiner

*Primary Examiner*—Jeanette Chapman
(74) *Attorney, Agent, or Firm*—Ross F. Hunt, Jr.; James J. McGroary

(57) ABSTRACT

A method is provided for joining a metallic member to a structure made of a composite matrix material. One or more surfaces of a portion of the metallic member that is to be joined to the composite matrix structure is provided with a plurality of outwardly projecting studs. The surface including the studs is brought into engagement with a portion of an uncured composite matrix material so that fibers of the composite matrix material intertwine with the studs, and the metallic member and composite structure form an assembly. The assembly is then companion cured so as to join the metallic member to the composite matrix material structure.

27 Claims, 2 Drawing Sheets

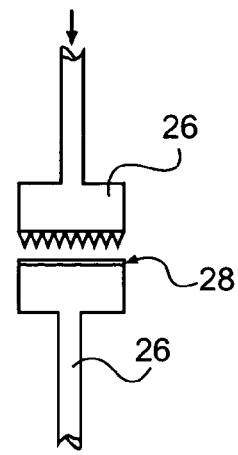
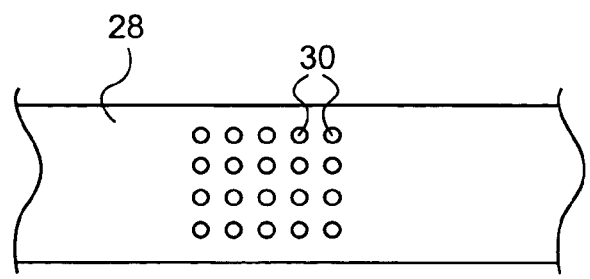
FIG. 7
FIG. 8
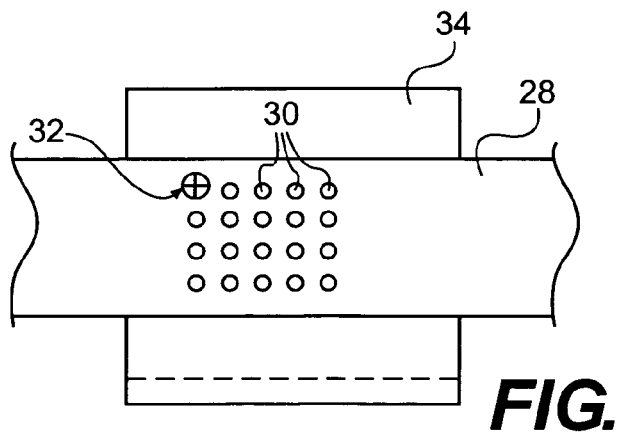
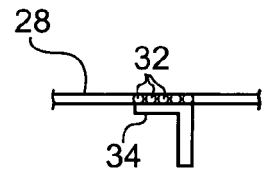
FIG. 9
FIG. 10
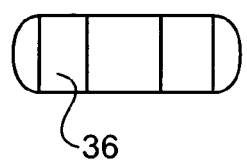
FIG. 11

METHOD OF JOINING METALLIC AND COMPOSITE COMPONENTS

ORIGIN OF THE INVENTION

This invention was made by an employee of the United States Government and may be manufactured and used by or for the Government for governmental purposes without the payment of any royalties.

BACKGROUND OF THE INVENTION

1. Field of the Invention

The present invention relates to thin-walled composite structures such as polymeric matrix composite structures, and more particularly, to methods for joining mechanical attachments of various types to such structures.

2. Description of the Related Art

Composites are increasingly being used in a number of different applications. The relative light weight and high strength characteristics of ceramic matrix composites (CMCs) and polymeric matrix composites (PMCs) make such composites particularly attractive for use in, e.g., the aerospace industry wherein stringent weight and strength requirements are common. In this regard, both PMCs and CMCs have been used, where practical, in many aerospace applications. However, no materials are perfect and the complexity of the underlying design requirements often lead to structures wherein multiple different materials are needed. For example, it is desirable in many applications to use the physical properties of such materials as aluminum, tungsten, invar and other high grade aerospace metals in conjunction with such light weight composites.

The manufacture of composite tanks, pressure vessels and other structures typically require the incorporation of flanges, feed throughs, and other mechanical attachments to the basic structure. For example, a typical light weight, high strength composite tank may require metallic flanges, structural reinforcements such as struts, feed through members and other mechanical attachments so as to enable the tank, vessel or other structure to meet subsystem requirements and environmental factors. These requirements, in turn, result in the need for openings and accoutrements to be provided in the composite tank and/or in additional loading on the composite material, and thus can have a dramatic impact on the stress concentration in and around the mechanical attachments.

It is a goal in designing structures wherein such attachments are joined to the basic composite structure to distribute stresses in all directions particularly at the interface between the metal attachment and the composite. For example, in tank structure wherein, as described above, a flange is attached to the composite tank, hoop stresses translated through a flanged opening in a three-dimensional interface, rather than a two-dimensional surface, will result in high strength characteristics and a decreased potential for debonding. Similarly, a tank strut or other structural attachment distributing mass acceleration loading of a tank is more effective in a three-dimensional, rather than two-dimensional, translation form. Moreover, debonding from "out-of-phase" forces (i.e., loads perpendicular to the layups of the composite) and interlaminar shear stresses are of concern in any tank design.

Currently, most multi-material tanks, such as those described above wherein metal attachments are joined to a basic composite tank structure, are made using epoxy bonding and mechanical attachment methods. However, these methods suffer important disadvantages. For example, an epoxy bond is a two-dimensional translation form that is subject to delamination while mechanical attachments can result in leaks and in fit problems.

SUMMARY OF THE INVENTION

In accordance with the invention, an improved method is provided for joining a metallic member or component to another member or structure made of a composite matrix material, wherein the above-mentioned disadvantages of prior art methods, such as delamination and leakage and fit problems, are eliminated or significantly reduced in severity.

According to one aspect of the invention, there is provided a method for joining a metallic member to a structure made of a composite matrix material, the method comprising the steps of:

providing a metallic member including a plurality of outwardly projecting studs on at least one surface of a portion of the metallic member;

mechanically joining the at least one surface including the studs with uncured composite matrix material of a composite matrix structure so that fibers of the uncured composite matrix material intertwine with the studs so as to form an assembly of the metallic member and the composite matrix structure; and companion curing the assembly so as to join the metallic member to the composite matrix structure.

In one preferred embodiment, the studs include caps at the distal ends thereof. In an alternative preferred embodiment, the studs include pointed ends, while in another alternative embodiment, the studs comprise flat studs.

In one implementation, the studs are formed integrally with the at least one surface of the metallic member. Advantageously, the studs of this implementation are machined as an integral part of the metallic member. In an alternative implementation, the studs are welded in place to the at least one surface of the metallic member. In another alternative implementation, the studs include screw threading and are affixed to the metallic member by this screw threading.

In one implementation the studs and the metal member are formed from the same material. In another implementation, the studs, the studs are formed of a material compatible with the matrix material and the metal material of the metallic member.

In one implementation, the metallic member comprises a flange and the structure comprises a tank to which the flange is to be joined.

In one advantageous implementation, the mechanical joining step comprises providing a plurality of holes in the uncured matrix material and inserting the studs into said holes.

In one preferred embodiment, the metallic member includes a plurality of said studs on opposed surfaces thereof and a different portion of the composite matrix structure is joined to each of the opposed surfaces.

In accordance with a further aspect of the invention, there is provided a method for joining a metallic member to a structure made of a composite matrix material, the method comprising:

providing, on at least one surface of a portion of the metallic member that is to be joined to the composite matrix structure, a plurality of studs that project outwardly from the at least one surface;

bringing the at least one surface provided with the studs into engagement with a portion of the composite matrix structure so that fibers of the composite matrix material intertwine with the studs; and companion curing the composite matrix material and at least said portion of metallic member so as to join the metallic member to the composite matrix material structure.

Further features and advantages of the present invention will be set forth in, or apparent from, the detailed description of preferred embodiments thereof which follows.

BRIEF DESCRIPTION OF THE DRAWINGS

FIG. 7 is a schematic side elevational view of a punch used in a method in accordance with one embodiment of the invention;

FIGS. 8 and 9 are schematic top plan views illustrating two further steps in the embodiment of FIG. 7;

FIG. 10 is a schematic side elevational view illustrating a step in the embodiment of FIG. 7; and FIG. 11 is a schematic side elevational view of an autoclave used in one step of the embodiment of FIG. 7.

DESCRIPTION OF THE PREFERRED EMBODIMENTS

Figure 1:
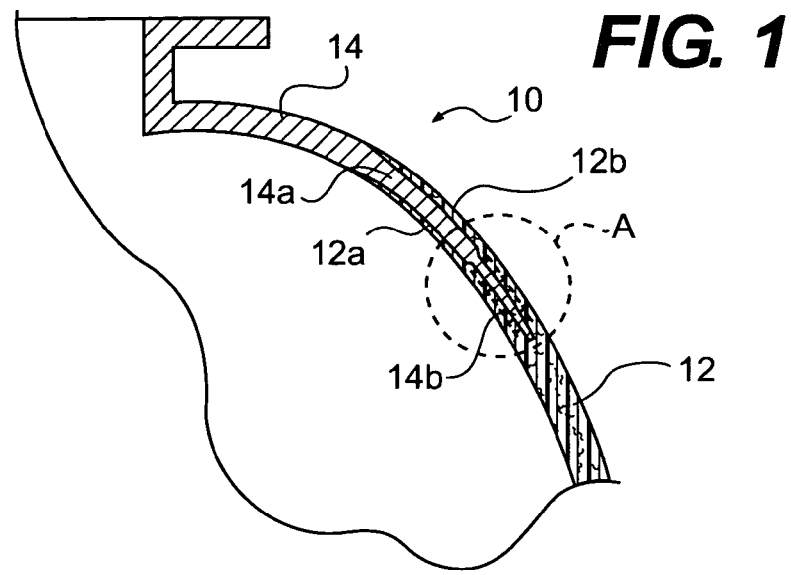
FIG. 1 is a schematic, partially broken away cross-sectional view of a metallic flange jointed to a composite tank.

Referring to FIG. 1, there is shown a portion of tank or vessel 10 which includes a main, thin-walled body 12 that forms the basic thin-walled tank structure and defines the tank interior, denoted 10a, and a flange member 14 which is joined or affixed to tank body 12. Tank body 12, in this exemplary embodiment, is of a generally spherical shape, only a portion of which is shown. Tank body 12 is made of a composite matrix material and, more preferably, is made of either a ceramic composite matrix material or a polymeric composite matrix material. Flange member 14 is preferably made at least partially of metal and, more preferably, wholly of metal. As discussed above, tanks of this general type wherein a metallic flange or other mechanical attachment is affixed thereto are conventional, and the present invention concerns an improved method for joining a metallic member, in this case, flange 14, to a composite structure, in this case, tank or vessel 12.

In the exemplary embodiment shown in FIG. 1, flange 14 includes a curved, generally hemispherical portion 14a which is of a curvature compatible with that of tank 12 and which, in this exemplary embodiment, serves as the top portion of the overall tank or vessel. Portion 14a includes a distal end portion 14b which is of reduced cross section, and inner and outer portions 12a and 12b of the composite material of tank 12 are joined to portion 14b as well as to an adjacent part of curved portion 14a of flange 14, as illustrated.

Figure 2:
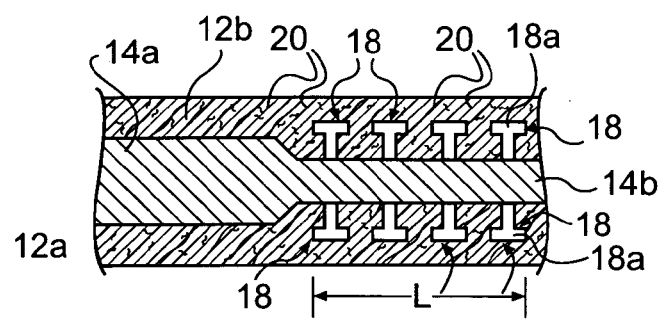
FIG. 2 is a schematic cross section of the portion of the flange-tank structure within circle A of FIG. 1 in accordance with one preferred embodiment of the invention.

Referring to FIG. 2, the cross-sectional view shown corresponds to the cross section within circled portion A of FIG. 1, and, as shown, the distal end portion 14b of flange 14 includes a plurality of studs or projections 18 on opposite sides thereof. In the embodiment of FIG. 2, the studs 18 are of a cap headed profile, i.e., include a cap 18a at the distal end, and are formed integrally with the reduced cross section portion 14b of flange 14. The provision of cap heads is advantageous in that the cap heads provide additional out-of-plane stress resistance. However, while this is one preferred embodiment, other embodiments may also be employed as discussed below.

The composite material forming tank 14 includes fibers which are indicated, in a highly schematic manner, at 20 in FIG. 2. Fibers 20 are intertwined with the protruding studs 18 in a full depth layup which extends beyond a variable development length indicated at L in FIG. 2.

When the relevant portions of the flange 14 and tank 12 described above are integrated, a companion curing step is carried out. To explain, the composite material of tank 12 is initially "wet" or uncured and, in one preferred embodiment, holes are, e.g., drilled into the "wet" composite, or otherwise formed therein, in which the studs 18 are received so that there is mechanical joining of the flange 14 and tank 12 to form a flange-tank assembly. In alternative embodiments, the mechanical joining of the flange 14 and tank 12 can be accomplished using high pressure punches and/or weaving of the fibers around the studs 18 as described in more detail below. The resultant assembly of flange 14 and tank 12 is then companion cured in an autoclave or the like. In an exemplary, non-limiting implementation, a maximum temperature of about 350° F. is used, together with a slow cool down period (e.g., 10 to 15° F./hr) to prevent any induced stress due to the differences in the coefficient of thermal expansion (CTE) between the metal material (e.g., aluminum) of the flange 14 and the composite material of the tank 12.

Figure 3:
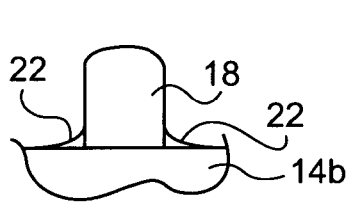
FIGS. 3, 4 and 5 are cross-sectional views of three different embodiments of the studs shown in FIG. 1.
Figure 4:
Figure 5:
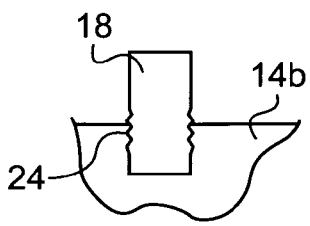

As indicated above, studs 18 can be of different shapes and take other forms than the capheaded form illustrated in FIG. 2. The studs 18 can be smooth, flat, threaded, or pointed, and can be machined as an integral part of the component to be joined (e.g., flange 14 in the exemplary embodiment), welded in place, or drilled/tapped in place. Referring to FIGS. 3 to 5, different embodiments of stud 18 are shown. In FIG. 3, the stud 18 is of a smooth or rounded shape and is welded to flange portion 14b by weldments indicated schematically at 22. In FIG. 4, stud 18 is of a pointed profile and is formed integrally with flange portion 14b. In FIG. 5, stud 28 is flat on top and includes screw threading 24 and is received in a tapped hole in flange portion 14b. It will be understood that different shapes and forming techniques can be used together so that, e.g., pointed stud 18 of FIG. 4 can be welded or drilled/tapped and flat stud 18 of FIG. 5 can be, e.g., welded to, or formed integrally with, flange 14. It is noted that studs that are machined or welded would be made of the parent material, i.e., the material of the metallic member or component (e.g., flange 14) but in embodiments wherein the studs 18 are affixed using drilling/tapping, such as the embodiment of FIG. 5, the studs, in one embodiment, are made of a polymeric or like composition compatible with the composite material of the composite structure (e.g., tank or vessel 12) or other suitable interface materials.

Figure 6:
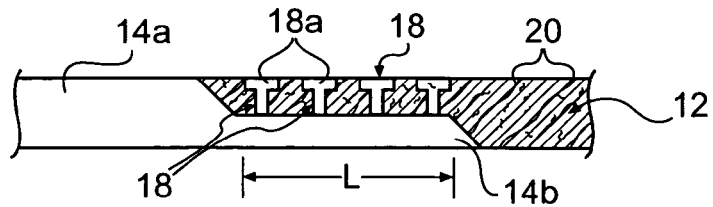
FIG. 6 is a schematic cross-sectional view of a portion of a flange-tank construction at which the flange and tank are joined, in accordance with a further preferred embodiment of the invention.

Referring to FIG. 6, a further embodiment of the invention is illustrated. This embodiment is similar to that of FIG. 2, and the similar elements have been given the same reference numerals. This embodiment differs from that of FIG. 2 in that studs 18 are provided on only one side of flange portion 14b, and a single distal end portion 12b of the composite material of tank 12 is joined to the flange 14.

Referring to FIGS. 7 to 11, a series of steps are represented that are performed in accordance with one exemplary embodiment of the invention. As shown in FIG. 7, this embodiment uses a high pressure mechanical punch 26 which includes upper and lower parts and which punches holes in the "wet" composite layup 28. In one exemplary embodiment, composite 28 comprises a "wet" layup of a prepreg fiber/resin system. This type of PMC may comprise multiple layers of prepreg containing high strength fibers in an array of different orientations.

As illustrated in FIG. 8, the holes, denoted 30, which are punched out by punch 26 are punched out in a predetermined pattern. It will, of course, be appreciated that the pattern can vary from that shown in FIG. 8.

Upon introducing the holes 30 into the "wet" layup or preply 28, a variety of different studs or fasteners can be inserted through the multiple sheet preply 28, and into the metallic (or ceramic) part or member (denoted 34 in FIGS. 9 and 10). This is shown in FIG. 9 for a single stud or fastener 32. (It will, of course, be appreciated that, in FIG. 9, further fasteners would fill all of the holes 30 in the completed assembly.)

Ideally, the fibers of the composite layup or preply 28 will maintain a close fit in and around the fasteners 32 whether the fastener is smooth or machined. Where the studs or fasteners 32 comprise screws as shown in FIG. 9, torque limits for the screws will be required in order to obtain optimal results. It will be appreciated that although simple L-shaped member 34 is shown in FIG. 10, as indicated above, the invention may be used with a wide range of metallic part configurations, with the main constraints on the use being scale issues, coefficient of thermal expansion (CTE), tooling integration and other autoclave vacuum bagging considerations.

Referring to FIG. 11, the "companion" curing of the composite-metallic member assembly described above is represented by an autoclave 36.

It will be appreciated that the punch 26 will require considerable force to penetrate layup 28 of the construction described above. Punch 26 should also be capable of being mobile to accommodate a wide range of part sizes and shapes. A family of punches may be used which are both stationary and mobile, and which incorporate features such as pin/stud insert prior to autoclave curing. The key to assembly simplification lies in the reduction of manufacturing steps. It is envisioned that system level designs incorporating these methods will eliminate tapping, drilling, inserts, adhesive and other labor intensive steps in alternative joining techniques. Mass produced components will particularly benefit from such techniques, and thus composites will be more easily introduced into a wide range of new products.

As indicated above, the present invention is applicable to both PMC and CMC materials. The term Ceramic Matrix Composites (CMCs) covers a family of different systems described in terms of their fabrication technologies, e.g., chemical vapor infiltration, directed metal oxidation, polymer-derived ceramics, oxide systems produced by sintering and hot-pressing, carbon-carbon composites and the like. Further, there are historical and developmental fabrication technologies such as sol-gel processing, reaction processing and fibrous monoliths.

It should be noted that the method of the invention will typically require the use of different techniques for CMCs versus PMCs, but the final architecture and companion curing philosophy are the same. For instance, a chemical vapor infiltration (CVI) fabrication technique may require special integration of the pre-form and the metallic part, as well as high temperature metals or transitional molten metals to achieve the desired architecture. The complete development of PMC alternatives in companion curing joining techniques will necessitate precise coefficient of thermal expansion (CTE) prediction tools and design techniques. It will be appreciated that the examples presented herein represent some possible ways of achieving robust metal to composite joints.

It is envisioned that the "metallic" parts utilized in a CMC process would include super alloys, refractory metals, metals with thermal coatings and ceramics configured for a family of post-processing mechanical attachments. These parts would be integrated with the CMC performs during the weaving process or the fibers would be weaved in a pattern that would support part integration prior to, e.g., chemical vapor infiltration (CVI) fabrication techniques. Similarly to PMCs, the thermal "ramp" profile prior to, during and after densification requires close calibration, with scaling issues, part CTE and materials limitations. Placement of carbon fibers during integration with the part should result in a configuration that does not hinder proper matrix infiltration and densification. For instance, fiber weaved in and around cap headed studs may require one layer close to the surface surrounded by laterally placed fibers interconnecting into an encompassing grid pattern that defines the CMC portion of the form.

It will be appreciated that although FIGS. 1 to 11 have been described in connection with joining a flange to a tank or other vessel, the basic method of joining metal or metallic components to composites in, for example, numerous aerospace applications such as fuselages, wings and other contoured surfaces, jet turbine components, and rocket motor attachments, and, more generally, in many other applications wherein a metallic member or component and a composite member or component are to be joined.

Although the invention has been described above in relation to preferred embodiments thereof, it will be understood by those skilled in the art that variations and modifications can be effected in these preferred embodiments without departing from the scope and spirit of the invention.

What is claimed:

1. A method for joining a metallic member to a structure made of a composite matrix material, said method comprising the steps of:

providing a metallic member including a plurality of outwardly projecting studs on at least one surface of a portion of the metallic member;

mechanically joining at least one surface including the studs with a portion of an uncured composite matrix material of a composite matrix structure so that fibers of the uncured composite matrix material intertwine with the studs so as to form an assembly of the metallic member and the uncured composite matrix structure; and companion autoclave curing the assembly in an autoclave so as to join the metallic member to the cured composite matrix structure.

2. A method according to claim 1 wherein said studs include caps at the distal ends thereof.

3. A method according to claim 1 wherein said studs are formed integrally with the at least one surface of the metallic member.

4. A method according to claim 3 wherein said studs are machined as an integral part of the metallic member.

5. A method according to claim 1 wherein said studs are welded in place to the at least one surface of the metallic member.

6. A method according to claim 1 wherein the studs include screw threading and are affixed to the metallic member by said screw threading.

7. A method according to claim 1 wherein the studs include pointed ends.

8. A method according to claim 1 wherein the studs comprise flat studs.

9. A method according to claim 1 wherein the studs and the metal member are formed from the same material.

10. A method according to claim 1 wherein the studs and the metal member are formed from different materials.

11. A method according to claim 10 wherein said studs are formed of a polymeric non-metallic material compatible with the metal material of the metallic member and the composite material of the composite member.

12. A method according to claim 1 wherein the metallic member comprises a flange and said structure comprises a tank to which the flange is to be joined.

13. A method according to claim 1 wherein the mechanical joining step comprises providing a plurality of holes in the uncured matrix material and inserting said studs into through said holes into metallic member.

14. A method according to claim 1 wherein the metallic member includes a plurality of said studs on opposed surfaces thereof and a different portion of said composite matrix structure is joined to each said opposed surfaces.

15. A method for joining a metallic member to a structure made of a composite matrix material, said method comprising the steps of:
- providing, on at least one surface of a portion of the metallic member that is to be joined to the uncured composite matrix structure, a plurality of studs that project outwardly from the at least one surface;
- bringing the at least one surface provided with the studs into engagement with a portion of the uncured composite matrix structure so that fibers of the uncured composite matrix material intertwine with the studs; and
- companion autoclave curing in an autoclave the uncured composite matrix material and at least said portion of metallic member so as to join the metallic member to the cured composite matrix material structure.

16. A method according to claim 15 wherein said studs include caps at the distal ends thereof.

17. A method according to claim 15 wherein said studs are formed integrally with the at least one surface of the metallic member.

18. A method according to claim 15 wherein said studs are welded in place to the at least one surface of the metallic member.

19. A method according to claim 15 wherein the studs comprise flat studs.

20. A method according to claim 15 wherein the studs include screw threading and are affixed to the metallic member by said screw threading.

21. A method according to claim 15 wherein the studs include pointed ends.

22. A method according to claim 15 wherein the studs and the metal member are formed from the same material.

23. A method according to claim 15 wherein the studs and the metal member are formed from different materials.

24. A method according to claim 23 wherein said studs are formed of a non-metallic material compatible with the metal material of the metallic member and the composite material of the composite member.

25. A method according to claim 15 wherein the metallic member comprises a flange and said structure comprises a tank to which the flange is to be joined.

26. A method according to claim 15 wherein the mechanical joining step comprises providing a plurality of holes in the composite matrix material and inserting said studs through said holes into the metallic member.

27. A method according to claim 15 wherein the metallic member includes a plurality of said studs on opposed surfaces thereof and a different portion of said composite matrix structure is joined to each of said opposed surfaces.

* * * * *